March 2, 1954  W. W. LEEPER  2,670,706
VEHICLE SIGNALING APPARATUS
Filed Sept. 12, 1952
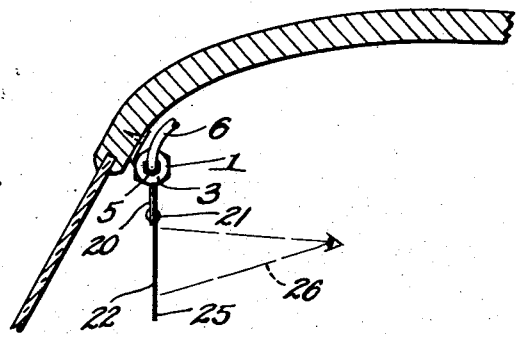
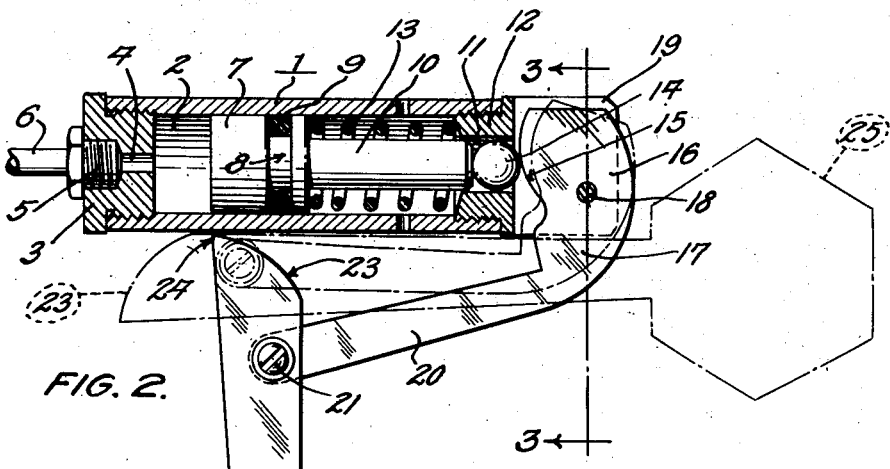
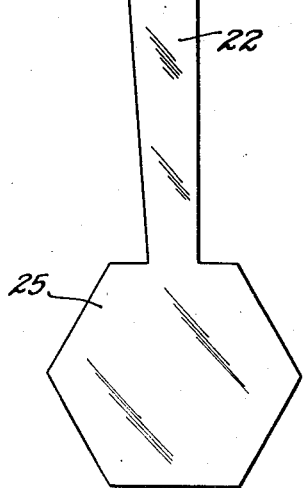
INVENTOR
WILLIAM W. LEEPER
BY
ATTORNEY Patented Mar. 2, 1954

2,670,706

UNITED STATES PATENT OFFICE 2,670,706

VEHICLE SIGNALING APPARATUS

William W. Leeper, Columbus, Ohio

Application September 12, 1952, Serial No. 309,199

2 Claims. (Cl. 116—65)

This invention relates to signalling devices, having particular reference to a signalling device for use in connection with motor vehicles equipped with pneumatically-actuated brake systems.

In the operation of motor vehicles of the heavier types, such as those employed in bus and truck service, the same quite commonly employ pneumatic brake systems. Such systems include pipe lines and reservoirs in which the air, or other gaseous fluid is contained under pressure. Often, from accidental causes fluid pressures in such systems necessary to operate the vehicle brakes are not present and the condition exists often without any knowledge thereof on the part of the vehicle driver.

Accordingly, it is an object of the present invention to provide a simple and effective signal which may be placed in the cab of a motor vehicle in a position to be readily viewed by its operator or driver, and wherein the signal is of the semaphore type having a movable arm which, when in one position, provides an indication to the vehicle operator of the presence of normal air pressures in the braking system to assure proper brake operation, and when in another position, immediately in the line of sight of the driver or operator, will serve to indicate clearly and unmistakably that insufficient air pressure is present in the system to operate the brakes.

It is another object of the invention to provide a signal of this character consisting of a cylinder in which is mounted a slidable signal arm actuating piston which is adapted to be moved in one direction by spring pressure applied thereto, and in an opposite other direction, to overcoming the spring pressure, by the application thereto of normal brake-operating air pressures, whereby through the movement of the piston an associated signalling arm, disposed exteriorly of the cylinder, is adapted to be moved between active and inactive positions readily viewable by the vehicle operator.

A further object of the invention is to provide a signal of this kind which is positive in its operation, of simple mechanical design and which may be produced at low cost.

For a further understanding of the invention, reference is to be had to the following description and the accompanying drawings, wherein:

Fig. 1 is a vertical longitudinal sectional view disclosing fragmentarily the interior upper portion of a vehicle cab, and illustrating the brake signal, comprising the present invention, operatively mounted therein.

Fig. 2 is a vertical longitudinal sectional view taken through the operating cylinder of my improved signal. In this figure there has been disclosed in full lines the position of the signalling arm of my improved device when actively positioned and in broken lines when inactively positioned.

Fig. 3 is a transverse vertical sectional view on the line 3—3 of Fig. 2.

Referring more particularly to the drawings, the numeral 1 designates the cylinder of the air-brake-signalling device for motor vehicles provided by the present invention. The cylinder includes an internal longitudinally extending piston chamber 2. One end of this chamber is internally threaded for the reception of a removable end plug 3, the latter being formed with a reduced axial bore 4, the latter being forwardly enlarged and internally threaded for the reception of a fitting 5 to which is connected a tube 6 employed in transmitting air under pressure from an associated motor vehicle brake system (not shown) to the chamber 2 of the cylinder. When the brake system is functioning normally, the air pressure within the forward part of the chamber 2 is substantially the same as that which prevails in the brake system proper. If for any reason the air pressure in the brake system should fall, a corresponding reduction in pressure will take place in the chamber 2, as will be readily understood.

The air pressure established within the chamber 2 is exerted on the forward face of a piston 7. In this instance the latter has been shown as being formed with an annular groove 8 in the body thereof which receives a compression ring 9 of yieldable material, by which the fluid under pressure is prevented from seeping past the piston, as it might if allowed to penetrate the joints formed between the outer surfaces of the piston and the internal wall surfaces of the chamber 2.

The piston terminates rearwardly in a rigid stem 10, the rear end of which being received in an axial passage 11 provided in a threaded cylinder closure member 12. In this instance a coil spring 13 surrounds the stem 10 and is interposed between the back of the piston 7 and the closure member 12, the spring 13 serving to force the piston forwardly against the air pressure applied to the forward face thereof, unless this tendency on the part of the spring is arrested by the force of the air pressure exerted on the piston. Normally, this air pressure is such as to overcome the action of the coil spring 13 and to produce compression of the latter, causing the piston to move rearwardly in opposition to the force of the spring, so that the stem 10 thereof will press against the ball 14 and thence against the arcuate edge surface 15 formed on the short upright arm 16 of a bell crank lever 17. This lever is pivotally mounted as at 18 on the rear bifurcated end of the cylinder 1. In this instance the bifurcation is produced by a vertical slot 19 provided in the closure member 12, and in which the arm 16 of the bell crank lever is pivotally mounted.

The longer arm 20 of said bell crank lever projects below the cylinder 1 and at its outer end is pivotally connected as at 21 with a semaphore type signalling arm 22. In this instance, the arm 22 is formed at its upper end with an arcuate edge 23 which terminates in a fulcrum point 24 when the arm is in its vertical dependent position of active operation, as shown in full lines in Fig. 2. When in this active position, the enlarged target-forming lower end 25 of the signalling arm will be disposed directly in the line of sight, indicated at 26, of the vehicle operator, so that the latter will be informed of the absence of operating air pressure in the associated brake system of the motor vehicle on which the signal is mounted. When proper air pressure is present to operate the brake system in a normal manner, the air pressure is built up in the chamber 2 in a manner causing the piston 7 to move rearwardly against the resistance of the spring 13. This movement results in the rocking of the bell crank lever 17 about its pivot 18, so that the longer arm 20 of said bell crank lever is raised from the full line position of Fig. 2 to approximately the dotted line position. This movement of the bell crank arm 20 causes rocking movement on the part of the signalling arm 22, compelling the latter to swing from the vertical dependent position, shown in full lines in Fig. 2, to the substantially horizontal dotted line position of Fig. 2. When in such dotted line position, the signalling arm is horizontally disposed and inactively located, so that it is out of the direct line of sight of the vehicle operator. The signalling arm normally occupies the aforesaid inactive position, and it is only when the air pressure in the brake system fails, for any reason, that said signalling arm drops to its active or vertically dependent position with respect to the cylinder 1.

It will thus be seen that the present invention provides a fully automatic signalling device which may be attached to any constant pressure air line of a motor vehicle, such as the air pressure gage line, windshield wiper or door-operating valve line, or any other corresponding part found on a motor vehicle equipped with a compressed air system. The signal is thus easy to install and is fully automatic and self-setting. The target carrying signalling arm 22 may be formed from a transparent or translucent plastic, so that even when the same occupies its dependent signalling position in the line of sight of the vehicle driver, it will not obstruct the latter's view of the preceding highway.

It will be understood that various changes may be made in the specific construction of the device without departing from the spirit and scope of the following claims.

I claim:

1. A signalling device of the type utilizing an elongated cylinder having a fluid pressure piston slidably mounted therein, said piston being provided with an actuating stem movable in one end of said cylinder in unison with the piston, the improvement comprising: a bell-crank lever formed with an actuating leg pivotally mounted at the end of said cylinder adjacent to that in which said stem is slidably mounted, an elongated angularly disposed arm-carrying leg arranged at one side in substantially longitudinally extending relation to said cylinder, and a semaphore-type signalling arm pivotally mounted on the outer end of the arm-carrying leg of said lever, said signalling arm being adapted to assume gravitationally a dependent signalling position in which it is disposed substantially perpendicularly to the longitudinal axis of said cylinder and with the upper end of the arm, above the pivotal connection thereof with the arm-carrying leg of said lever, in fulcrum-producing contact with said cylinder, whereby pressure applied to the actuating leg of said lever at a position above the pivotal union thereof with said casing and through movement of said stem, causes movement of the signalling arm about its pivotal support on the arm-carrying leg of said lever to move said arm to a position in which it extends beneath and substantially parallel with said cylinder.

2. A signalling device utilizing an elongated cylinder having a fluid pressure actuated piston slidably mounted therein, said piston being provided with an actuating stem movably mounted in one end of said cylinder, the improvement comprising: a fitting carried by the end of said cylinder, said fitting including an axially disposed bore in which said stem is slidably positioned, a ball element occupying said bore and in contact with the outer end of said stem, said fitting having a bifurcated portion extending beyond one end of said cylinder, a bell-crank lever formed with an actuating leg pivotally mounted in the bifurcated end of said fitting, said actuating arm being formed on one side thereof with an arcuate edge maintained in constant contact with said ball element but free from direct mechanical union therewith, said lever further including an arm-supporting leg disposed in angular relation to the actuating leg thereof, said arm-supporting leg being arranged at one side of and in substantially longitudinally extending relation to said cylinder, a semaphore-type signalling arm pivotally mounted on an outer end of the arm-supporting leg of said lever at a position intermediately of the length of said arm and contiguous to one side thereof, said arm assuming gravitationally a dependent signalling position in which it is disposed substantially perpendicularly to the longitudinal axis of said cylinder and with the upper end of the arm when said arm at dependent position having fulcrum-producing contact with the body of said cylinder, whereby upward rocking movement of the arm-carrying leg of said lever in response to outward movement of said stem serving to rock said arm about its pivotal connection with the arm-carrying leg of said lever to move said arm to a position in which it extends beneath and in substantially parallel longitudinal relationship with said cylinder.

WILLIAM W. LEEPER.

References Cited in the file of this patent

UNITED STATES PATENTS

| Number | Name | Date |
| --- | --- | --- |
| 555,809 | High | Mar. 3, 1896 |
| 2,010,488 | Huddleston | Aug. 6, 1935 |
| 2,137,495 | Kershaw | Nov. 22, 1938 |